UNITED STATES PATENT OFFICE.

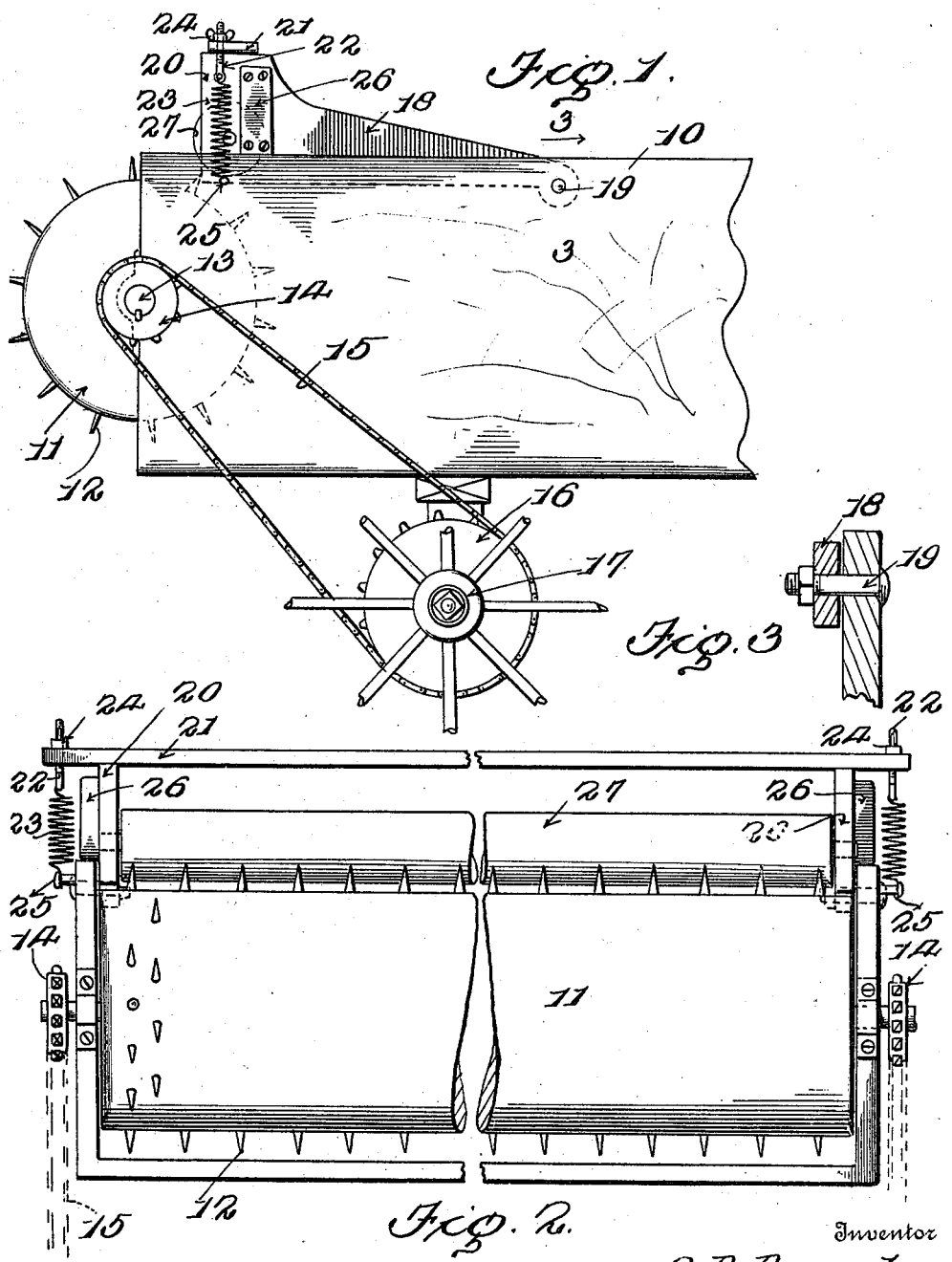

OSER B. BEARD, OF RAPHINE, VIRGINIA.

FERTILIZER-DISTRIBUTER.

963,267. Specification of Letters Patent. Patented July 5, 1910.

Application filed August 25, 1909. Serial No. 514,557.

*To all whom it may concern:*

Be it known that I, OSER B. BEARD, citizen of the United States, residing at Raphine, in the county of Rockbridge and State of Virginia, have invented certain new and useful Improvements in Fertilizer-Distributers, of which the following is a specification.

This invention relates to fertilizer distributers and refers particularly to an attachment to be applied to the same whereby the efficiency of the device is increased.

An object of the invention is to provide an attachment whereby the cylinder employed in connection with the distributer will be caused to distribute the fertilizer in a powdered form and will not be permitted to throw lumps or clusters of the same from the wagon.

The invention has for another object an attachment for a distributer of this character, whereby the fertilizer is pulverized and is distributed in accordance with the size desired, the same being effected by the provision of the adjusting means for the attachment.

The invention has for a further object the provision of a device of this character which may be applied to distributers of conventional formation, so as not to necessitate the special construction of the wagon body or operating parts of the device of this attachment.

The invention still further aims at the provision of an attachment effecting these results which will work automatically and which will not depend on the connection of the same to the wheels of the operating mechanism of the distributer.

For a full understanding of the invention, and the merits thereof and to acquire a knowledge of the details of construction reference is to be had to the following description and accompanying drawings, in which:

Figure 1 is a side elevation of the rear end of a distributer having the improved attachment applied thereto, Fig. 2 is a rear elevation of the same; and, Fig. 3 is a section on the line 3—3 of Fig. 1.

Corresponding and like parts are referred to in the following description and indicated in all the views of the accompanying drawings by the same reference characters.

Referring to the drawings numeral 10 designates the body of the distributer which is a common box form and in the rear end of which is mounted the distributing cylinder 11 upon which is disposed, in the usual manner, a plurality of radially extended teeth 12. The cylinder 11 is mounted upon a transverse shaft 13 journaled across the end of the body 10 and upon the outer extremity of which is disposed a sprocket 14 carrying a chain 15 passing over a sprocket 16 of larger diameter than the sprocket 14 which is mounted upon the rear wheels 17. The cylinder 11 may be provided with any other suitable actuating means of conventional form than herein described and shown, as this forms no part of this invention.

Against the inner faces of the sides of the wagon box 10 a pair of arms 18 are positioned which are apertured and reduced at their forward extremities through which bolts 19 are extended for the purpose of pivotally supporting the arms 18 in their position. The bolts 19 are engaged through the sides of the body 10 adjacent the edges of the same in order to permit of the upwardly extending of the arms 18 above the edges of the body 10 at their rear ends. The rear extremities of the arms 18 carry a frame which is composed of the sides 20 formed by the enlargement of the arms 18 and across the upper edges of which is engaged a beam 21, having its opposite extremities extended beyond the outer faces of the sides 20 and beyond the sides of the wagon box 10. The extensions of the beam 21 carry eye-bolts 22 having the eyes thereof extended downwardly for the reception of the upper extremities of the springs 23. The upper ends of the eye-bolts 22 are provided with winged nuts 24 which engage upon the upper face of the beam 21 and adjust the positioning of the bolts 22 through same. The lower extremities of the spring 23 are extended downwardly and secured through the medium of pins 25 to the outer face of the sides of the body 10 and serve the purpose of drawing the beam 21 downwardly against the upper edges of the body. The arms 18 are provided with blocks 26 which are secured upon the outer faces of the sides 20 and adapted to rest upon the upper edges of the sides of the box 10 whereby the downward movement of the beam 21 is limited. The arms 18 are so located within the box 10 that the lower ends of the sides 20 are positioned adjacent the teeth 12 of the cylinder 11 and a roller 27 is journaled between the sides 20 at the lower ends thereof and is distanced slightly from the outer ends of the teeth 12.

In operation after the fertilizer is raised from the bed of the box 10 the same frequently clusters and forms lumps carried by the teeth 12 as these lumps are brought into contact with the roller 27 the same are crushed and caused to crumble thereby permitting of a limited amount of the same passing over the cylinder 11 and throwing the remainder thereof back into the box 10. The roller 27 is permitted a slight yielding motion as the springs 23 are so adjusted as to permit of such movement and may be adjusted as to their tension in order to regulate the size of the particles of the fertilizer which are carried over the cylinder 11. The frame is permitted a vertical movement by reason of the pivotal relation of the arms 18 with the box 10.

Having thus described the invention, what is claimed as new is:

1. A device as specified including a wagon box, a pair of arms hingedly mounted against the sides of said wagon box and adjacent the upper edges thereof, sides formed upon the rear ends of said arms, a beam positioned across the upper edges of said sides and extended laterally beyond the same, springs mounted upon the extensions of said beams and sides of said wagon body, a roller rotatably disposed between the lower ends of said sides and blocks positioned against the outer faces of said sides for engagement against the upper edges of said wagon body.

2. A device as specified including a wagon body, a pair of arms pivotally disposed against the sides of said wagon body adjacent the outer edges thereof, a beam positioned across the rear ends of said arms, a roller mounted between said arms beneath said beam, blocks carried by said arms for engagement with said wagon body to limit the movement of said arms and springs adjustably interposed between said wagon body and said beam for yieldably holding said blocks against said wagon body.

3. In combination with a fertilizer distributer having a wagon box and a cylinder located in the rear end of the wagon box, of a pair of arms hingedly mounted against the inner sides of said box adjacent the upper edges thereof, enlargements formed upon the outer ends of said arms, a beam secured across the upper edges of said enlargements and longitudinally extended beyond the same, springs depended from the ends of said beam and secured against the outer faces of the side of said box, a roller mounted between the lower end of said enlargements, and blocks positioned against the outer faces of said enlargements for engagement against the upper edges of the sides of said wagon box.

In testimony whereof I affix my signature in presence of two witnesses.

OSER B. BEARD. [L. S.]

Witnesses:
M. C. SUPINGER,
T. P. WILSON.